July 21, 1931.  R. L. BOHANNON  1,815,541
ANIMAL TRAP
Filed May 5, 1928
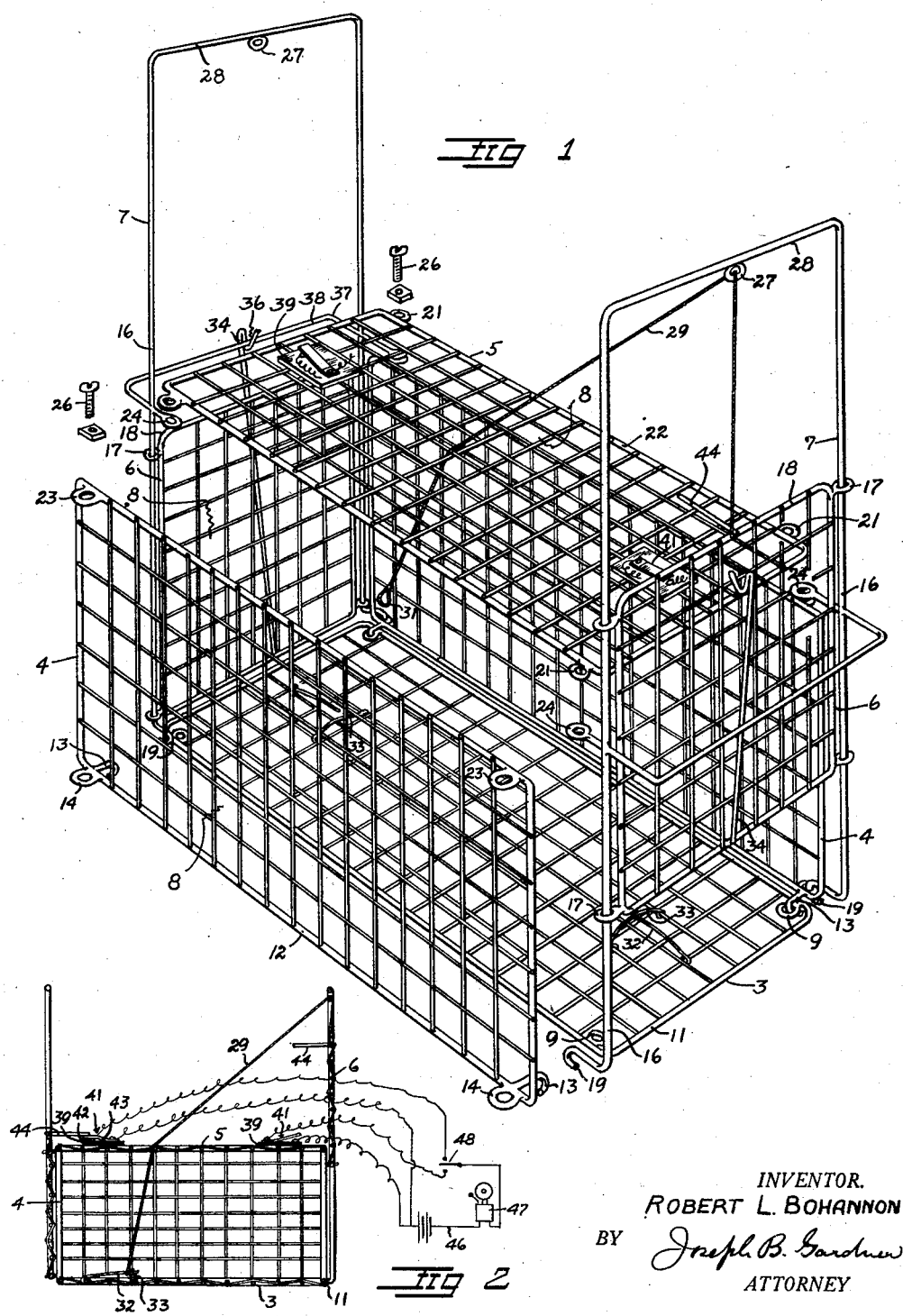
INVENTOR.
ROBERT L. BOHANNON
BY *Joseph B. Gardner*
ATTORNEY Patented July 21, 1931

1,815,541

UNITED STATES PATENT OFFICE

ROBERT LEE BOHANNON, OF BERKELEY, CALIFORNIA, ASSIGNOR OF FIFTY-ONE ONE-HUNDREDTHS TO AUGUST ADRIAN THIEL, OF OAKLAND, CALIFORNIA

ANIMAL TRAP

Application filed May 5, 1928. Serial No. 275,292.

The invention relates to an animal trap of knock-down structure designed to entrap animals alive and without hurting them.

An object of the invention is to provide a knock-down trap of the class described which is formed of a minimum number of elements.

Another object of the invention is to provide a trap of the class described in which the means for securing the elements together is disposed for ready availability from the outside of the trap.

A further object of the invention is to provide a trap of the class described in which the various wall elements are arranged to be nested together in particularly compact relation when the trap is in knocked-down form.

A still further object of the invention is to provide in a trap of the class described audible signal means operable when the trap is sprung at a point remote from the trap.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a perspective view of a trap embodying the invention, certain of the elements of the structure being spaced from their operative positions.

Figure 2 is a reduced view showing the trap in longitudinal side section and an electric signal circuit associated with the trap, the showing of the latter being partly diagrammatic.

Essentially, and as shown, the trap of my invention, comprises a bottom panel 3, side panels 4, a top panel 5, and end panels 6, the latter constituting doors for the trap. The bottom, side, and top panels are arranged to be releasably secured together at their registering edges by means to be hereinafter more particularly described, and the door panels 6 are slidably mounted in frames 7 disposed and held at the ends of the structure defined by the former panels. As shown, each of the aforesaid panels comprises a continuous rectangular frame formed of a length of metallic rod or wire and carrying a section of metallic grating 8 of suitable mesh within the area defined by its frame, it being clear, however, that some or all of the panels might be imperforate if such is desired.

The means for securing the various panels in their proper positions in a set up trap are preferably provided as parts of the panel structures as far as such is possible. As particularly shown, eyes 9 are provided in the bottom panel 3, said eyes projecting inwardly from the side portions of the panel frame member 11 adjacent the ends of said portions and in the plane of the grating 8, and being welded or otherwise fixed to the frame member 11 whereby it is integrally related thereto. Provided on the bottom edge portion of the frame 12 of the side panels 4 are hooks 13, said hooks extending transversely inwardly from the panels 4 and being engageable in the eyes 9 of the bottom panel 3 whereby a lateral displacement of the side panels with respect to the bottom panel may be prevented when the hooks are engaged in the eyes 9 and the side panels 4 extend transversely upwardly from the plane of the bottom panel 3. Preferably, and as shown, the hooks 13 are U-shaped and are integrally attached to the side panel frame members 12.

Also provided at the bottoms of the side panels are eyes 14, said eyes extending transversely outwardly from the panels with their planes horizontal. As herewith particularly shown, the eyes 14 are integral with the bottom portion of the panel frame 12 and are opposite the hooks 13. The door frames 7, it will now be noted, comprise a wire or rod shaped in the general form of an inverted U having its side members 16 parallel. Pairs of eyes 17 extend laterally from the sides of the door panels 6, said eyes being disposed perpendicularly to the plane of the panel for the reception of the frame members 16, whereby the door panels are slidably engaged with the door frames. Preferably, and as shown, the eyes 17 are fixedly related to the door panels by being integrally secured to the frame members 18 of such panels. Formed at the bottom of the door frame members 16 are hooks 19, said hooks extending transversely inwardly from the members 16 and the plane of the door frame, and being generally coplanar with their members 16. The hooks 19 are arranged for engagement in the eyes 14 of the side panels whereby a lateral displacement of a door frame with respect to the bottom panel may be prevented when the hooks 19 thereof are engaged in the eyes 14 of the opposed ends of the side panels 4 and the door frame extends transversely upwardly from the plane of the bottom panel 3.

It will now be clear that the side panels 4 are arranged for a pivotal and releasable engagement of the bottoms thereof with the bottom panel 3, that the door frames 7 are in turn arranged for a pivotal and releasable engagement with the side panels 4, and that when the side panels 4 and frames 7 are disposed to extend transversely upwardly of the bottom panel 3 with the side edges of the frames generally parallel to the frame members 16, the various members are locked together against disengagement and the trap receptacle is defined.

Means are provided for so mounting the top panel 5 on the structure now defined that it not only serves as a top closure for the trap receptacle but also serves to hold the side panels and door frames fixed in the hereinbefore described receptacle defining relation. Extending laterally from the top panel 5 at opposite side edges thereof and adjacent the ends of said edges are eyes 21, said eyes being disposed in the plane of the panel and being preferably formed integral with the panel frame 22 as shown. When the top panel 5 is operatively disposed, the side edges thereof are arranged to lie substantialy in the planes of the side panels 4 whereby the eyes 21 extend outwardly of said planes. Eyes 23 are provided at the top edges of the side panels 4, said eyes extending transversely outwardly from their panels in parallel and underlying relation to the different eyes 21 whereby the eye openings of each pair are aligned. Preferably, and as shown, the eyes 21 and 22 are integral with the panel frames which carry them.

Mounted on the door frame members 16 to extend transversely therefrom are members providing eyes 24, the planes of said eyes being generally perpendicular to said members and parallel to the planes of the eyes 21 and 23. When the structure is assembled in the manner hereinbefore indicated, each eye 24 is arranged to be disposed at and against at least one of the eyes 21 or 23 of a cooperating pair and with its opening in alignment with the openings of said eyes—in the present structure, each eye 24 is arranged for engagement between the eyes 21 and 23 thereat, it being noted that sets of registering eyes 21, 23 and 24 are provided adjacent each of the four upper corners of the structure. Preferably, and as shown, the members providing the eyes 24 are integrally fixed to the door frame members 16 which carry them. With the sets of eyes in registration as described, suitable fastening members, such as bolts 26, are passed therethrough whereby the cage parts are secured in fixed relation. The disposal of the various eyes outwardly of the panels, it will be particularly noted, is designed to facilitate a setting up or taking apart of the trap structure, as well as leaving the trap space free of protruding members which might injure an animal seeking to escape from the trap.

The doors 6, it will now be noted, are arranged to operate as drops for closing the end openings of the trap, and each door frame 7 is accordingly of such height as to permit a raising of its door therein to a fully opened position. For holding the doors in raised position, eyes 27 are provided on each top cross member 28 of the door frames, through which a cord 29 attached to the top of the door is arranged to be slidably engaged, the free end of the cord being arranged to be releasably held by a suitable trigger mechanism provided in the trap. As shown, the free cord end is provided with a loop 31 through which a bar 32 pivoted at one end to the bottom panel 3 is arranged to be passed. With the bar 32 engaged through the cord loop 31, the free bar end is arranged to be engaged under a catch member or trigger 33 hingedly carried on the bottom panel 3 and arranged to have the bait (not shown) fixed thereto. In this manner, an animal in pulling on the bait to displace the catch 33 in a direction to free the bar 32 is arranged to release the door for permitting a free dropping thereof to its closed position. It will be noted, however, that other door holding and release means might be used without departing from the spirit of the present invention. It will be clear that either one or both of the doors may be set in the manner described.

Detent means are preferably provided whereby, when a door is dropped, it may be positively and releasably held against raising. As shown, a spring bar 34 is provided on each door, said bar extending upwardly from the bottom edge of the door and being formed at its upper end to provide a crotch 36. Fixed across the door frames 7 in outwardly offset relation thereto, and to the doors are members 37, said members being here shown as generally U-shaped and disposed with their planes horizontal. When a door is raised, the spring bar 34 is arranged to slidably engage the intermediate portion 38 of the member 37, and when the door is fully lowered, the crotch 36 is arranged to underlie the portion 38 whereby a lifting of the door is prevented unless the bar 34 is sprung inwardly before the door is lifted. In this manner, the door is arranged to be locked shut by and upon its lowering. It is noted that the door mounting and control means are identical at the two ends of the trap, whereby either one or both of the doors may be set in open position as desired. If both doors are to be set in open position, they would, of course, be connected to the same trigger mechanism.

It will now be noted that the trap structure of the present invention is particularly designed for capturing animals generally one at a time and without injuring them. In order that a trap may be used most efficiently and an entrapped animal may not be unduly exposed therein, signal means are preferably provided whereby a trapper may be advised of the closing of the trap. Where a plurality of traps is set, the signal means for all the traps set should be at a central point. Or, if the condition of a trap is to be ascertained from a dwelling, a signal means might desirably be provided in or at the dwelling. Since, in either case, the distances involved may be considerable and the operation of a loud alarm is usually undesirable, an electrically controlled signal is provided in the present instance as being particularly applicable.

Mounted on the ends of the top panel 5 are switch blocks 39 carrying switches 41. As shown, the switches each comprise a contact point 42 and a spring contact member 43 arranged, when the associated door is in closed position, to be depressed to engage the point 42. For effecting a closure of the switches 41, arms 44 are provided on the doors 6, said arms extending sufficiently inwardly from the top edges of the doors for engaging the contact members 43 of the switches. The switches 41 are connected in a signal circuit 46, said circuit being here shown as including a bell 47 as a signal means therein, it being obvious however, that, if desired, the circuit 46 might include a lamp or other form of signal means without departing from the spirit of the invention. Suitable switch means 48 are preferably provided for selectively including the different switches 41 in the signal circuit. In this manner, an observer may be immediately apprised of the springing of a trap, whereby a maximum use of the trap is afforded and an undue exposure of an entrapped animal is arranged to be avoided.

I claim:

1. In a knock down animal trap, a bottom panel, opposed side panels releasably engaged with said bottom panel, a door for closing an end of the trap, a frame for said door releasably engaged with said side panels, a top panel, and means on said panels and frame whereby they may be releasably secured in relatively fixed relation, said means including members extending inwardly of and being integral with said frame and coacting members extending laterally outward from said panels.

2. In an animal trap, a bottom panel, opposed side panels hingedly and releasably engaged at the bottom thereof with said bottom panel, a door for closing an end of the trap, a frame for said door hingedly and releasably engaged at the bottom thereof with and between said side panels, a top panel, and eyes integral with said panels and frame arranged to be disposed in registering relation for the reception of a bolt or the like therethrough for releasably securing the panels and frame in fixed relation.

3. In an animal trap, a bottom panel, opposed side panels releasably engaged at the bottom thereof with said bottom panel, a door for closing an end of the trap, a frame for said door, means on said side panels and frame providing for a releasable engagement of the frame with and between said panels adjacent the bottom thereof, said means lying transversely outwardly of said side panels, and means releasably securing said frame to said side panels adjacent the top edges thereof, said latter means comprising coacting elements lying transversely outwardly of said side panels, and elements on the frame extending inwardly thereof to position of registration with the first named elements.

4. In a knock down animal trap, bottom, side and top panels respectively releasably secured together to define a receptacle having an open end; a door for said open trap end; a frame for said door; and cooperating means on said frame and panels for releasably securing said frame to the receptacle, said means lying entirely outwardly of the cavity of said receptacle, and including elements extending inward from said frame and substantially parallel with said side panels.

In testimony whereof, I have hereunto set my hand at Oroville, California, this 28 day of April, 1928.

ROBERT LEE BOHANNON.